(12) United States Patent
Fischer et al.

(10) Patent No.: US 9,765,809 B2
(45) Date of Patent: Sep. 19, 2017

(54) METHOD FOR PRODUCING A SPINDLE DRIVE FOR AN ADJUSTING ELEMENT OF A MOTOR VEHICLE

(71) Applicant: Brose Schliesssysteme GmbH & Co. KG, Wuppertal (DE)

(72) Inventors: Uwe Fischer, Sonneberg (DE); Robert Neundorf, Ebersdorf (DE)

(73) Assignee: Brose Schliesssysteme GmbH & Co. KG, Wuppertal (DE)

( * ) Notice: Subject to any disclaimer, the term of this patent is extended or adjusted under 35 U.S.C. 154(b) by 437 days.

(21) Appl. No.: 14/353,213

(22) PCT Filed: Sep. 24, 2012

(86) PCT No.: PCT/EP2012/003991
§ 371 (c)(1),
(2) Date: Apr. 21, 2014

(87) PCT Pub. No.: WO2013/056780
PCT Pub. Date: Apr. 25, 2013

(65) Prior Publication Data

US 2014/0270912 A1 Sep. 18, 2014
US 2015/0198200 A9 Jul. 16, 2015

(30) Foreign Application Priority Data

Oct. 21, 2011 (DE) .................. 10 2011 116 559

(51) Int. Cl.
*F16C 11/06* (2006.01)
*F16J 15/3204* (2016.01)
(Continued)

(52) U.S. Cl.
CPC ............ *F16C 11/06* (2013.01); *E05F 15/622* (2015.01); *F16J 15/3204* (2013.01);
(Continued)

(58) Field of Classification Search
CPC .... B60G 7/005; B60G 2204/416; B62D 7/16; B62D 7/166; E05F 15/622;
(Continued)

(56) References Cited

U.S. PATENT DOCUMENTS 4,367,968 A * 1/1983 Ishida .................. E05F 1/1091
403/122
2007/0062317 A1 3/2007 Nagai et al.
2009/0044645 A1 2/2009 Buescher

FOREIGN PATENT DOCUMENTS

DE 1844242 12/1961
DE 8610903 U 7/1986
(Continued)

OTHER PUBLICATIONS

"Two-Shot Plastic Injection Molding." Northeast Mold & Plastics, Inc. Apr. 7, 2007, [online], [retrieved on May 23, 2016] Retrieved from the Internet <URL: https://web.archive.org/web/20070704061934/http://www.jobshop.com/techinfo/papers/twoshotplasticinjectionmolding.shtml>.*
(Continued)

*Primary Examiner* — Josh Skroupa
(74) *Attorney, Agent, or Firm* — Pauly, DeVries Smith & Deffner LLC

(57) ABSTRACT

A method for producing a spindle drive for an adjustable element of a vehicle, wherein the spindle drive has a substantially tubular spindle drive housing and two connections for diverting driving movements, wherein at least one connection of the spindle drive has a connection head which is connected to the spindle drive via a connection neck which is thinner than the connection head. A sealing cap for the spindle drive housing is provided with a sealing opening, in order to install the sealing cap, the sealing cap is pulled with the sealing opening thereof over the connection head of a connection of the spindle drive, and the peripheral region
(Continued)

of the sealing opening is elastically deformed by the engagement with the connection head and is therefore widened, and that the peripheral region of the sealing opening is subsequently deformed back elastically in frictionally sealing engagement with the connection neck.

19 Claims, 3 Drawing Sheets

(51) Int. Cl.
  *E05F 15/622* (2015.01)
  *F16H 25/20* (2006.01)
(52) U.S. Cl.
  CPC ....... *E05Y 2201/11* (2013.01); *E05Y 2600/40* (2013.01); *E05Y 2800/12* (2013.01); *E05Y 2900/546* (2013.01); *F16H 2025/2037* (2013.01); *Y10T 403/32729* (2015.01)
(58) Field of Classification Search
  CPC ............ E05Y 2201/11; E05Y 2600/40; E05Y 2800/12; E05Y 2900/546; F16C 11/06; F16C 11/0623; F16C 11/0628; F16C 11/0633; F16C 11/0638; F16J 15/3204; F16H 2025/2087; Y10T 403/134; Y10T 403/32311; Y10T 403/32631; Y10T 403/32721; Y10T 403/32729; Y10T 403/32737; Y10T 403/32786; Y10T 403/32795; Y10T 403/32803
  USPC ..... 403/90, 122, 133–135, 141–143; 296/56, 296/146.4
  See application file for complete search history.

(56) References Cited

FOREIGN PATENT DOCUMENTS

| DE | 202008016615 | 4/2010 | |
|----|--------------|--------|---|
| EP | 1862628 | 12/2007 | |
| FR | 2856452 A1 * | 12/2004 | ......... F16H 25/2418 |

OTHER PUBLICATIONS

PCT International Search Report and Written Opinion from International Application No. PCT/EP2012/003991, corresponding to U.S. Appl. No. 14/353,213, mailed Dec. 18, 2012, 10 pages.

* cited by examiner a)

b)

METHOD FOR PRODUCING A SPINDLE DRIVE FOR AN ADJUSTING ELEMENT OF A MOTOR VEHICLE

CROSS-REFERENCE TO RELATED APPLICATIONS

This application is a national stage application under 35 U.S.C. 371 of Inter-national Patent Application Serial No. PCT/EP2012/003991, entitled "Verfahren zur Herstellung eines Spindelantriebs für ein Verstellelement eines Kraftfahrzeugs," filed Sep. 24, 2012, which claims priority from German Patent Application No. DE 20 2011 116 559.6, filed Oct. 21, 2011, the disclosures of which are incorporated herein by reference.

FIELD OF THE INVENTION

The present invention relates to a method for producing a spindle drive for an adjustable element of a motor vehicle.

BACKGROUND

The spindle drive under discussion can be used for all possible adjustable elements in a motor vehicle. Examples include a tailgate, a rear cover, an engine hood, a side door, a loading compartment flap, a sunroof or the like of a motor vehicle.

A known spindle drive (EP 1 862 628 A1) serves to adjust a tailgate of a motor vehicle. The spindle drive is arranged in the region of a rain channel assigned to the tailgate opening and has a two-part spindle drive housing. During an adjustment of the spindle drive, the two housing parts run telescopically one into the other. The housing parts are correspondingly of tubular design.

The known spindle drive has two connections for diverting driving movements, which connections are furthermore each connected to the drive via a connection bearing. The connections each provide a ball socket for a ball/ball-socket mounting. Accordingly the connections have a connection head which receives the ball socket and is mounted in the respective connection bearing via a connection neck which is thinner than the connection head.

The connection regions of the known spindle drive regularly constitute weak points in respect of the tightness of the drive housing, in particular in respect of the ingress of dust and moisture. This relates in particular to the bearing points there for the connections. In this context, it is known to undertake sealing measures, such as the retrospective insertion of butyl cords or the like at the potential ingress points for dust or moisture. Said measures are costly in respect of the sealing material, time-consuming in respect of the installation process and often inadequate in respect of the long-term sealing effect which can be achieved.

The invention is based on the problem of specifying a method for producing a drive for an adjustable element of a motor vehicle, with which method the tightness of the drive housing can be increased in a specific manner using simple structural means.

SUMMARY

The conceptual basis of the solution according to the proposal is the use of a sealing cap for the spindle drive housing with a sealing opening, the peripheral region of which, in the fitted state, is in frictionally sealing engagement with the connection neck of a connection of the spindle drive. In the present case, the term "sealing" should always be understood to mean in respect of avoiding the ingress of dust and moisture.

It has been identified according to the proposal that, despite the configuration of the relevant connection with a connection head and a connection neck which is thinner than the connection head, the sealing cap can be installed particularly simply and effectively in respect of the sealing.

In detail, it is proposed that, in order to install the sealing cap, in an installation step the sealing cap is pulled with the sealing opening thereof over the connection head of the relevant connection of the spindle drive, that, in the process, the peripheral region of the sealing opening is elastically deformed by the engagement with the connection head and is therefore widened, and that the peripheral region of the sealing opening is subsequently deformed back elastically in frictionally sealing engagement with the connection neck. It should be emphasized that, within the context of the installation step, in addition to the peripheral region any other regions of the sealing cap can also be deformed.

The solution according to the proposal can be used in a particularly simple production method with a sealing cap of corresponding elastic configuration. In the simplest case, the installation step according to the proposal is associated with a single linear movement along the drive axis. The installation step can then be readily carried out in an automated manner.

As a result of the fact that the peripheral region of the sealing opening is automatically deformed back into the sealing position thereof after being elastically widened, finishing work in order to ensure adequate sealing is not required. The method according to the proposal can therefore be carried out rapidly and cost-effectively.

According to a further embodiment, a spindle drive with a fitted sealing cap is included.

It is essential, according to this further teaching, that an above-discussed sealing cap for the spindle drive housing is provided with a sealing opening, wherein the peripheral region of the sealing opening is in frictionally sealing engagement with the connection neck.

According to the further teaching, it has been identified that the connection neck itself can provide a sealing surface which imposes particularly low demands on the seal, here the sealing cap. According to the proposal, the equipping of the sealing cap with a sealing opening is sufficient here, with it merely being necessary to ensure a frictionally sealing contact of the peripheral region of the sealing opening. The above, frictionally sealing contact can be ensured in that the sealing cap is composed of an elastic material, in particular of an elastomer, at least in the region of the sealing opening.

In an embodiment, the invention provides a method for producing a spindle drive for an adjustable element of a motor vehicle, wherein the spindle drive has, along a geometrical spindle drive axis, a substantially tubular spindle drive housing and two connections for diverting driving movements, wherein at least one connection of the spindle drive has a connection head which is furthermore connected to the spindle drive via a connection neck which is thinner than the connection head, wherein a sealing cap for the spindle drive housing is provided with a sealing opening, in that, in order to install the sealing cap, in an installation step the sealing cap is pulled with the sealing opening thereof over the connection head of a connection of the spindle drive, and in that, in the process, the peripheral region of the sealing opening is elastically deformed by the engagement with the connection head and is therefore widened, and in that the peripheral region of the sealing opening is subsequently deformed back elastically in frictionally sealing engagement with the connection neck.

In an embodiment, the sealing cap has a cover-like section receiving the sealing opening and, subsequent thereto, a sleeve-like section, and in that the sleeve section is pulled or pushed in particular in a sealing manner over the tubular spindle drive housing.

In an embodiment, an encircling web with an axial height extent with respect to the spindle drive axis is provided on the sealing cap around the sealing opening, said web furthermore being brought during the installation step into correspondingly axial, supporting and/or sealing engagement with the spindle drive.

In an embodiment, before the installation step, the sealing cap is produced by 2-component plastics injection molding.

In an embodiment, the spindle drive has, along a geometrical spindle drive axis, a substantially tubular spindle drive housing and two connections for diverting driving movements, wherein at least one connection of the spindle drive has a connection head which is furthermore connected to the spindle drive via a connection neck which is thinner than the connection head, wherein a sealing cap for the spindle drive housing is provided with a sealing opening, and in that the peripheral region of the sealing opening is in frictionally sealing engagement with the connection neck.

In an embodiment, a spindle drive motor and a spindle/spindle-nut mechanism connected downstream of the spindle drive motor are arranged in the spindle drive housing.

In an embodiment, the sealing opening forms an expansion fit with the connection head and/or the connection neck, in an embodiment the sealing opening is circular and, in the unfitted, undeformed state, has a diameter which is at least 10% smaller, or at least 25% smaller, than the maximum diameter of the connection head perpendicularly to the spindle drive axis.

In an embodiment, the connection head provides a component, in particular a ball socket, for a ball/ball-socket mounting, which is furthermore coupled, in particular coupled rotatably, to the spindle drive via the connection neck.

In an embodiment, the sealing cap has a cover-like section receiving the sealing opening and, subsequent thereto, a sleeve-like section, and in that the sleeve section is pulled or pushed over the tubular spindle drive housing, such as the sleeve section is pulled or pushed in particular in a sealing manner over the tubular spindle drive housing.

In an embodiment, an encircling web with an axial height extent with respect to the spindle drive axis is provided on the sealing cap around the sealing opening, said web furthermore being supported in a correspondingly axial manner on the spindle drive.

In an embodiment, the web is furthermore supported in a sealing manner on the spindle drive, such as the connection is mounted in a connection bearing, and in that the associated bearing point is sealed off from the outside firstly by the sealing peripheral region of the sealing opening and secondly by the sealing web.

In an embodiment, the sealing cap is composed of a different material in the cover section than in the sleeve section, and in an embodiment the sealing cap is produced by 2-component plastics injection molding.

In an embodiment, the cover section is connected to the sleeve section in an integrally bonded, form-fitting or friction manner.

In an embodiment, the sealing cap is composed of an elastic material, in particular of an elastomer, at least in the region of the sealing opening, and in some embodiments in that the sealing cap is composed in its entirety of an elastic material, in particular of an elastomer.

In an embodiment, the material of the sleeve section is harder and/or stiffer than the material of the cover section.

BRIEF DESCRIPTION OF THE FIGURES

The invention is explained in more detail below with reference to exemplary embodiments. In the drawing.

DETAILED DESCRIPTION

Figure 1:
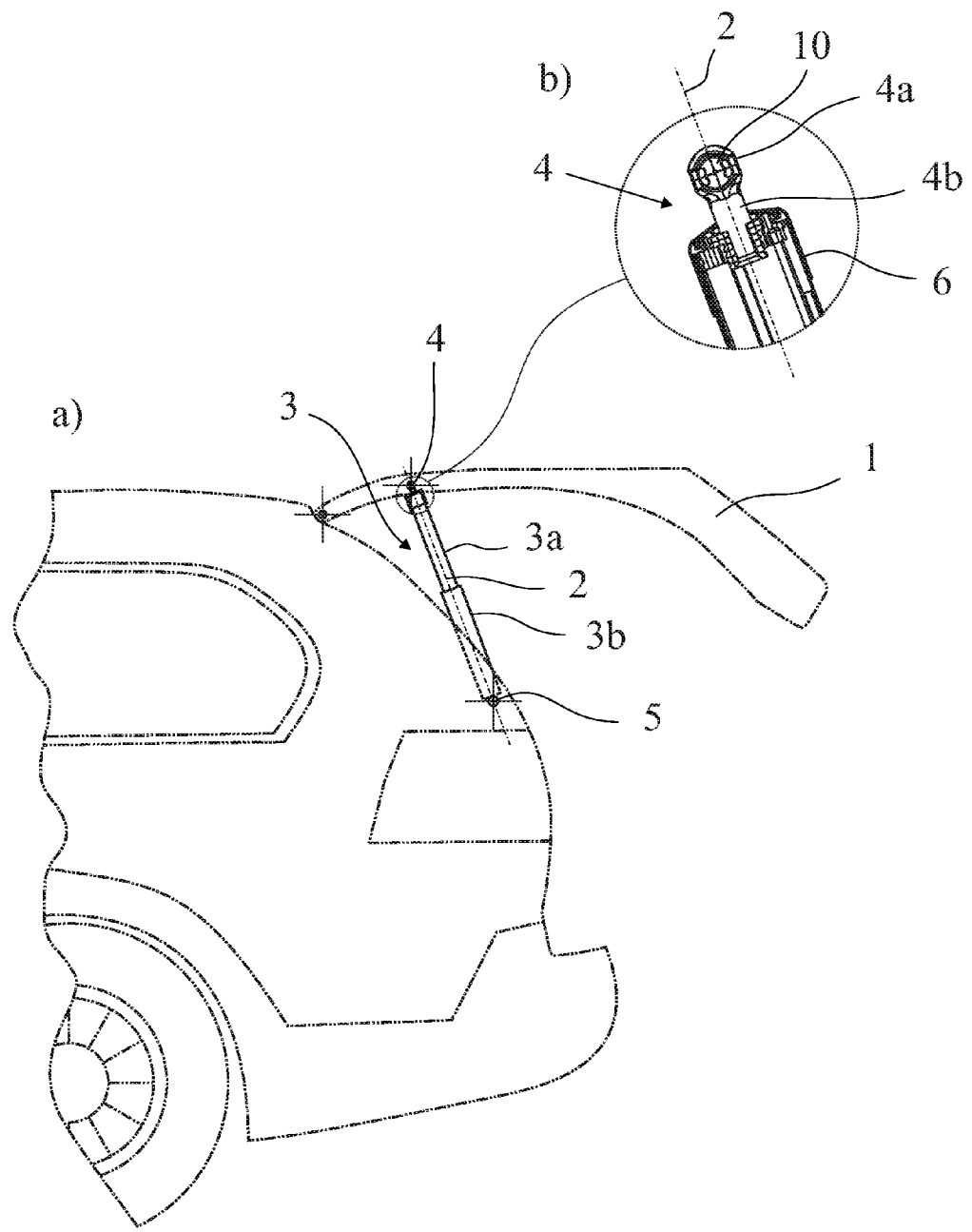
FIG. 1 shows, in a schematic side view, the rear region of a motor vehicle with a spindle drive according to the proposal in FIG. 1 a) and FIG. 1 b) shows a close up of a portion of a connector.

The spindle drive illustrated in the drawing serves for the motorized adjustment of an adjustable element 1, which is configured as a tailgate, of a motor vehicle. However, the spindle drive according to the proposal can be used for all possible adjustable elements 1 of a motor vehicle. Examples which may be mentioned here include a rear cover, an engine hood, a side door, a loading compartment flap, a sunroof or the like of a motor vehicle.

The spindle drive has a substantially tubular spindle drive housing 3 along a geometrical spindle drive axis 2 and two connections 4, 5 for diverting linear driving movements.

The spindle drive housing 3 is of two-part configuration and is composed of an upper housing part 3a and a lower housing part 3b. The two housing parts 3a, 3b are of tubular configuration with a substantially round cross section. The two housing parts 3a, 3b run telescopically one into the other in a manner known per se during adjustment of the spindle drive.

The two connections 4, 5 of the spindle drive are respectively provided with a connection head 4a which is furthermore connected to the spindle drive via a connection neck 4b which is thinner than the connection head 4a. In the present case, the detail "thinner" should always be understood as meaning with regard to the respective extent perpendicular to the spindle drive axis 2. The connection neck 4b is aligned with the drive axis 2.

The fact that the spindle drive always has a sealing cap 6 for the spindle drive housing 3, said sealing cap being provided with a sealing opening 7, is essential. The peripheral region 7a of the sealing opening 7 here is in frictionally sealing engagement with the connection neck 4b. In principle, the two connections 4, 5 can each be assigned such a sealing cap 6. The proposal according to the invention is explained below by way of the upper connection 4 in FIG. 1a) shown in detail in FIG. 1b).

The linear driving movements which are diverted via the connections 4, 5 are produced by a spindle drive motor (not illustrated) and a spindle/spindle-nut mechanism (likewise not illustrated) connected downstream of the spindle drive motor. With regard to the basic construction of the spindle drive, reference should be made to this extent to EP 1 862 628 A1 which belongs to the applicant and the contents of which are hereby fully incorporated in the subject matter of this application.

In the present case, the installation of the above sealing cap 6 obtains very particular importance. The installation step for installing the sealing cap 6 is illustrated in three sub-steps a), b), d) in FIG. 2. First of all, the sealing cap 6 is positioned over the associated connection 4. The sealing cap 6 is subsequently drawn with the sealing opening 7 thereof over the connection head 4*a* of the connection 4 (FIG. 2*b*)). In the process, the peripheral region 7*a* of the sealing opening 7 is elastically deformed by engagement with the connection head 4*a* and is therefore widened, which can readily be seen in the illustration according to FIG. 2*b*). Finally, the sealing cap 6 passes over the connection head 4*a*, with the peripheral region 7*a* of the sealing opening 7 being elastically deformed back in frictionally sealing engagement with the connection neck 4*b*, i.e. in frictionally sealing contact with the connection neck 4*b*. The state deformed back to this extent is illustrated in FIG. 2*d*).

Figure 2:
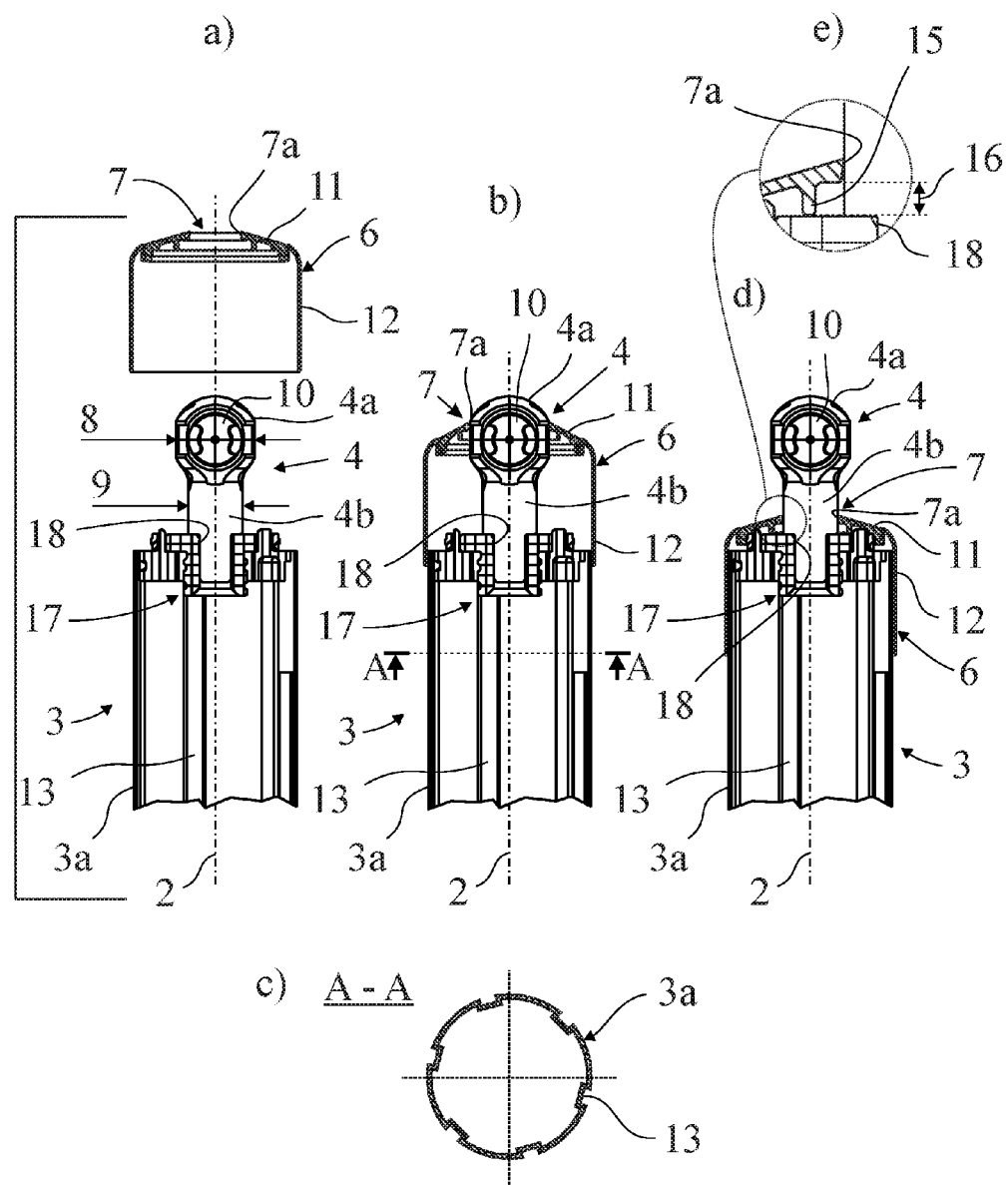
FIG. 2 shows, in a sectioned side view, the upper connection region of the spindle drive according to FIG. 1 a) before the installation of the sealing cap, b) during the installation of the sealing cap, c) shows a sectional view of a portion of FIG. 2 b), d) after the installation of the sealing cap, and e) shows a detailed view of a portion of FIG. 2 c)

It can be gathered from the illustration according to FIG. 2 that the installation of the sealing cap 6 can proceed, in particular, in an automated manner, with particularly little outlay. This is in particular because the installation step can be exclusively associated with a movement of the sealing cap 6 along the spindle drive axis 2.

The design of the connection 4 and of the associated sealing cap 6 obtains very particular importance to the solution according to the invention. The sealing opening 7 can form an expansion fit with the connection head 4*a*. In the present case, this means that the connection head 4*a* can be guided through the sealing opening 7 only with an expansion of the peripheral region 7*a* of the sealing opening 7. It is additionally provided that the sealing opening 7 also forms a corresponding expansion fit with the connection neck 4*b*, and therefore the frictional connection between the peripheral region 7*a* of the sealing opening 7 and the connection neck 4*b* is ensured.

Figure 3:
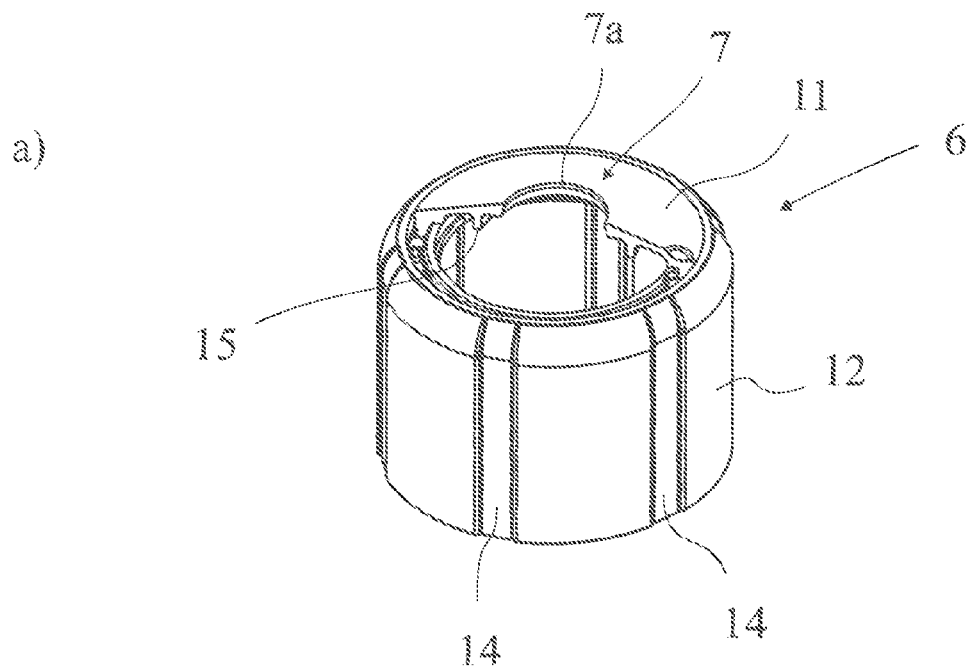
FIG. 3 shows a) the sealing cap according to FIG. 2 and b) a further sealing cap according to the proposal, in each case in a perspective, partially sectioned view.
Figure 3:
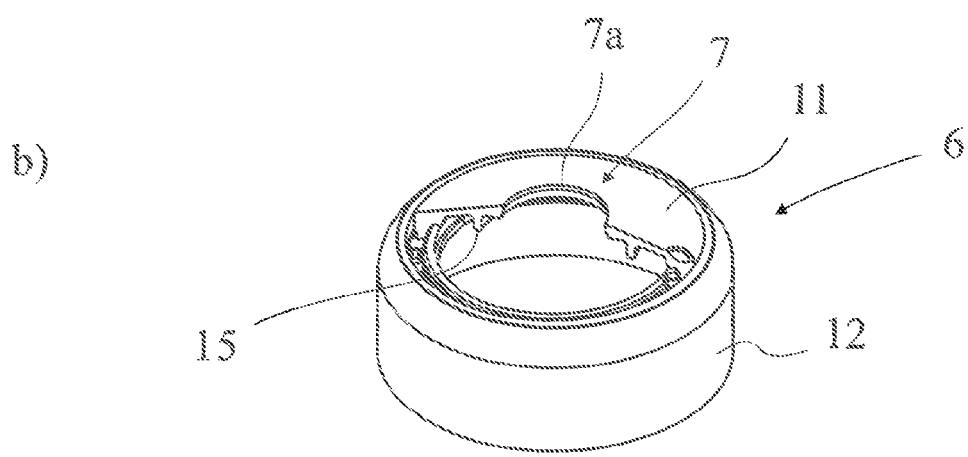

In the configurations illustrated in FIG. 3, the sealing opening 7 of the sealing cap 6 is of circular configuration. In principle, any other geometries for the sealing opening 7 are conceivable.

In the unfitted and undeformed state illustrated in FIG. 3, the sealing opening 7 of the sealing cap 6 can have a diameter which is at least 10% smaller, or at least 25% smaller than the maximum diameter 8 of the connection head 4*a* perpendicular to the spindle drive axis 2. In the present case, "maximum diameter 8 of the connection head" means the maximum extent of the connection head 4*a* perpendicular to the spindle drive axis 3.

Furthermore, provision can be made for the minimum diameter 9 of the connection neck 4*b* to be at least 10% smaller, in particular at least 25% smaller, than the maximum diameter 8 of the connection head 4*a* in each case perpendicular to the spindle drive axis 2. Accordingly, "minimum diameter 9 of the connection neck" means the minimum extent of the connection neck 4*b* perpendicular to the spindle drive axis 2.

It can be gathered from the illustration according to FIG. 2 that the connection head 4*a* provides a component, a ball socket 10, of a ball/ball-socket mounting, which is furthermore coupled, in particular rotatably coupled, to the spindle drive via the connection neck 4*b*. The ball/ball-socket mounting serves for the coupling of the spindle drive in terms of drive to the adjustable element 1, here to the tailgate 1, of the motor vehicle. In an embodiment, the connection 4 consisting of the connection head 4*a* and connection neck 4*b* is formed integrally, in particular from a metal material.

The basic construction of the sealing cap 6 that is illustrated in FIG. 3 is of interest. The sealing cap 6 can have a cover-like section 11 which receives the sealing opening 7 and is referred to below as "cover section". The cover section 11 is adjoined by a sleeve-like section 12 which is referred to below as "sleeve section". In the method according to the proposal, the sleeve section 12 is drawn or pushed, in particular, in a sealing manner over the tubular spindle drive housing 3, as can be gathered from the illustration according to FIG. 2*d*). The extent to which there is sealing here depends substantially on the design of the spindle drive housing 3 and of the sleeve section 12 of the sealing cap 6.

It can be gathered from the illustration according to FIG. 2*b*), in particular from the sectional illustration there along the section line A-A shown in FIG. 2*c*), that the housing part 3*a* has a series of guide grooves 13 which are in guiding engagement in a form-fitting manner with corresponding formations (not illustrated) on the corresponding housing part 3*b*.

In the embodiment of the sealing cap 6 illustrated in FIG. 3*a*), the sleeve section 12 is provided with inwardly projecting webs 14 which, in the fitted state (FIG. 2*d*)), are in engagement in a form-fitting manner with the guide grooves 13. With this virtually ideal form-fitting connection between the housing part 3*a* and the sleeve section 12, optimum sealing between the housing part 3*a* and the sleeve section 12 is ensured.

However, in some cases of use, an ideal sealing between the housing part 3*a* and the sealing cap 6 is not desired at all. This is the case, for example, if a certain lack of tightness for the automatic drainage of liquid out from the spindle drive housing 3 is required. In such a case, provision can be made for the housing according to FIG. 3*b*) to be pushed onto the housing part 3*a* not in a form-fitting manner. A combination of the housing part 3*a* illustrated in FIG. 2 with the sealing cap 6 illustrated in FIG. 3*b*) results in the guide grooves 13 being able to serve to a certain extent as a drainage channel.

The illustration of the detail according to FIG. 2*e*) shows a particularly interesting aspect of the solution according to the proposal. Provision is made here for an encircling web 15 having an axial height extent 16 with respect to the spindle drive axis 2 to be provided around the sealing opening 7 on the inside of the sealing cap 6, said web furthermore being brought during the installation step into correspondingly axial, supporting and, sealing engagement with the spindle drive. The web 15 here forms a ring-like formation running around the sealing opening 7.

After the installation step, the web 15 is then furthermore supported in a sealing manner on the spindle drive and thereby acts in respect of the sealing effect thereof in series with the sealing opening 7.

Furthermore, the above web 15 also has very particular importance in conjunction with the coupling of the connection 4 to the spindle drive. The connection 4 is namely mounted in a connection bearing 17, wherein the associated bearing point 18 is sealed off from the outside by the sealing peripheral region 7*a* of the sealing opening 7 and by the sealing web 15. The web 15 here acts on the connection bearing 17 substantially in the axial direction with respect to the drive axis 2, while the peripheral region 7*a* of the sealing opening 7 acts on the connection neck 4*b* substantially in the radial direction with respect to the drive axis 2. This can best be seen in the illustration according to FIGS. 2*d*) and 2*e*).

The sealing cap 6 can be configured in different materials. In an embodiment, the sealing cap 6 in the cover section 11 always consists of a different material than in the sleeve section 12, wherein, in an embodiment, the sealing cap 6 is produced by 2-component plastics injection molding. In principle, multi-layered materials, in particular sandwich materials, can also be used here as the materials.

In principle, it is conceivable for the cover section 11 to be connected to the sleeve section 12 in an integrally bonded, form-fitting or frictional manner. In particular, adhesive bonds are conceivable here.

The sealing cap 6 should be composed of an elastic material, in particular of an elastomer, at least in the region of the sealing opening 7. However, it is also conceivable for the sealing cap 6 as a whole to be composed of an elastic material, in particular of an elastomer. An example which may be mentioned here is the elastomer PTS-Thermoflex-60 HH. The hardness (Shore A, ISO 868) can be between 50 and 65, in particular around 61.

In an embodiment, provision is finally made for the material of the sleeve section 12 to be designed to be harder and/or stiffer than the material of the cover section 11. This takes into account the fact that, depending on the case of use, the sleeve section 12 may have less of a sealing function and more of a fastening function.

The invention claimed is:

1. A method for producing a spindle drive for an adjustable element of a motor vehicle, wherein the spindle drive has, along a geometrical spindle drive axis, a substantially tubular spindle drive housing and two connections for diverting driving movements, wherein at least one connection of the spindle drive has a connection head which is furthermore connected to the spindle drive via a connection neck which is thinner than the connection head, wherein a sealing cap for the spindle drive housing is provided with a sealing opening, in that, in order to install the sealing cap, in an installation step the sealing cap is pulled with the sealing opening thereof over the connection head of the at least one connection of the spindle drive, and in that, in the process, a peripheral region of the sealing opening is elastically deformed by the engagement with the connection head and is therefore widened, and in that the peripheral region of the sealing opening is subsequently deformed back elastically in frictionally sealing engagement with the connection neck.

2. The method as claimed in claim 1, wherein the sealing cap has a cover-like section receiving the sealing opening and, subsequent thereto, a sleeve-like section, and in that the sleeve section is pulled or pushed in particular in a sealing manner over the tubular spindle drive housing.

3. The method as claimed in claim 1, wherein an encircling web with an axial height extent with respect to the spindle drive axis is provided on the sealing cap around the sealing opening, said web furthermore being brought during the installation step into correspondingly axial, supporting and/or sealing engagement with the spindle drive.

4. The method as claimed in claim 1, wherein, before the installation step, the sealing cap is produced by 2-component plastics injection molding.

5. A spindle drive for an adjustable element of a motor vehicle, wherein the spindle drive has, along a geometrical spindle drive axis, a substantially tubular spindle drive housing and two connections for diverting driving movements, wherein at least one connection of the spindle drive has a connection head which is furthermore connected to the spindle drive via a connection neck which is thinner than the connection head, wherein a sealing cap for the spindle drive housing is provided with a sealing opening, and wherein a peripheral region of the sealing opening is configured to be elastically deformed by an engagement with the connection head and the seal opening is configured to be widened from the engagement, and in that the peripheral region of the sealing opening is configured to subsequently deform back elastically in frictionally sealing engagement with the connection neck.

6. The spindle drive as claimed in claim 5, wherein the sealing opening forms an expansion fit with the connection head and/or the connection neck.

7. The spindle drive as claimed in claim 6, wherein the sealing opening is circular and, in the unfitted, undeformed state, has a diameter which is at least 10% smaller, than the maximum diameter of the connection head perpendicularly to the spindle drive axis.

8. The spindle drive as claimed in claim 5, wherein the connection head is rotatably coupled to the spindle drive via the connection neck.

9. The spindle drive as claimed in claim 5, wherein the sealing cap has a cover-like section receiving the sealing opening and, subsequent thereto, a sleeve-like section, and in that the sleeve section is pulled or pushed over the tubular spindle drive housing.

10. The spindle drive as claimed in claim 9, wherein the sealing cap is composed of a different material in the cover section than in the sleeve section.

11. The spindle drive as claimed in claim 10, wherein the material of the sleeve section is harder and/or stiffer than the material of the cover section.

12. The spindle drive as claimed in claim 10, wherein the sealing cap is produced by 2-component plastics injection molding.

13. The spindle drive as claimed in claim 9, wherein the cover section is connected to the sleeve section in an integrally bonded, form-fitting or friction manner.

14. The spindle drive as claimed in claim 9, wherein the sleeve section is pulled or pushed in particular in a sealing manner over the tubular spindle drive housing.

15. The spindle drive as claimed in claim 5, wherein an encircling web with an axial height extent with respect to the spindle drive axis is provided on the sealing cap around the sealing opening, said web furthermore being supported in a correspondingly axial manner on the spindle drive.

16. The spindle drive as claimed in claim 5, wherein the web is furthermore supported in a sealing manner on the spindle drive.

17. The spindle drive as claimed in claim 16, wherein the connection is mounted in a connection bearing, and in that the associated bearing point is sealed off from the outside firstly by a sealing peripheral region of the sealing opening and secondly by the sealing web.

18. The spindle drive as claimed in claim 5, wherein the sealing cap is composed of an elastic material, in particular of an elastomer, at least in the region of the sealing opening.

19. The spindle drive as claimed in claim 18, wherein the sealing cap is composed in its entirety of an elastic material, in particular of an elastomer.

* * * * *